United States Patent
Langlais et al.

(10) Patent No.: US 9,131,454 B2
(45) Date of Patent: Sep. 8, 2015

(54) COMPENSATING POWER SPECTRAL DENSITY FOR POWER LEVELS

(71) Applicant: QUALCOMM Incorporated, San Diego, CA (US)

(72) Inventors: Brian James Langlais, Almonte (CA); Ehab Tahir, Mississauga (CA); Joubin Karimi, Ottawa (CA); John Fraser Chappel, Mississauga (CA); Son Binh Cam, Scarborough (CA); Richard David Roze, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 13/799,974

(22) Filed: Mar. 13, 2013

(65) Prior Publication Data

US 2014/0266641 A1   Sep. 18, 2014

(51) Int. Cl.
| | |
|---|---|
| H04K 1/02 | (2006.01) |
| H04L 25/03 | (2006.01) |
| H04L 25/49 | (2006.01) |
| H04W 52/28 | (2009.01) |
| H04B 3/54 | (2006.01) |
| H04L 5/00 | (2006.01) |
| H04B 1/10 | (2006.01) |

(52) U.S. Cl.
CPC ............... *H04W 52/288* (2013.01); *H04B 3/54* (2013.01); *H04L 5/0046* (2013.01); *H04L 25/03834* (2013.01); *G08C 2201/30* (2013.01); *H04B 2001/1063* (2013.01); *H04B 2203/5425* (2013.01)

(58) Field of Classification Search
CPC .................................................. H04B 1/71635
See application file for complete search history.

(56) References Cited

U.S. PATENT DOCUMENTS

| | | | |
|---|---|---|---|
| 6,317,003 B1* | 11/2001 | Kobayashi | 330/306 |
| 7,483,365 B2 | 1/2009 | Blasco et al. | |
| 7,974,583 B2 | 7/2011 | Duvaut et al. | |
| 8,064,537 B2 | 11/2011 | Xu et al. | |
| 2005/0281238 A1* | 12/2005 | Blasco Clarest et al. | 370/343 |
| 2007/0041429 A1* | 2/2007 | Khandekar | 375/146 |
| 2007/0121740 A1* | 5/2007 | Gallagher | 375/260 |
| 2007/0165693 A1 | 7/2007 | Samuel Mo et al. | |
| 2008/0318534 A1* | 12/2008 | Mak et al. | 455/91 |
| 2011/0164514 A1 | 7/2011 | Afkhamie et al. | |
| 2011/0164670 A1 | 7/2011 | Abad et al. | |
| 2011/0317723 A1* | 12/2011 | Abad Molina et al. | 370/475 |
| 2012/0243633 A1* | 9/2012 | Herrick | 375/295 |
| 2012/0263471 A1* | 10/2012 | Buchali et al. | 398/74 |

OTHER PUBLICATIONS

Yonge L., et al., Research Article, "An overview of the HomePlug AV2 technology," Hindawi Publishing Corporation, Journal of Electrical and Computer Engineering, 2012, pp. 1-18.

* cited by examiner

*Primary Examiner* — Sam K Ahn
*Assistant Examiner* — Fabricio R Murillo Garcia
(74) *Attorney, Agent, or Firm* — DeLizio Law, PLLC (57) ABSTRACT

A power spectral density (PSD) shape may be modified based upon the transmitter power setting of a transmitter. The power associated with notched frequencies and adjacent frequencies may be adjusted responsive to a change in transmitter power setting. As a result of adjusting the power for the notched frequencies and adjacent frequencies when operating at the different transmitter power setting, the performance of the transmission system is improved. The PSD shape may be considered dynamic, being modified responsive to a change in transmitter power setting by adjusting power associated with notches in the PSD shape based on the transmitter power setting and PSD constraint.

16 Claims, 9 Drawing Sheets

COMPENSATING POWER SPECTRAL DENSITY FOR POWER LEVELS

BACKGROUND

Embodiments of the inventive subject matter generally relate to the field of power spectral density, and, more particularly, to power spectral density shape for transmitted signals.

Communication technology is evolving to utilize multi-frequency transmissions over a communications medium. For example, in many technologies, such as powerline communications, a transmitting device may send signals via a plurality of frequencies to one or more other devices coupled to the communications medium. Other medium and technologies may also use multi-carrier transmissions in which multiple frequencies are used over a communication channel.

A power spectral density (PSD) shape refers to power distribution for signals over different frequencies. For example, power may be reduced for a subset of the frequencies used over the communication channel. Reducing power for particular frequencies may also be referred to as "notching" or "filtering." In some communications medium, certain frequencies are required to be notched, and may be referred to as notched, reserved, or rejection bands.

SUMMARY

Various embodiments are described for modifying a power spectral density shape with respect to changes in transmission power settings. A power spectral density shape is modified to compensate for changes in transmission power level. Modifications to the power spectral density may allow for greater physical layer throughput at various power levels.

In one embodiment, a first power spectral density (PSD) shape for a transmitter is determined based on a first transmitter power setting. The PSD shape may include reduced power associated with a notch and adjacent frequencies. After the first PSD shape is determined, a second transmitter power setting different from the first transmitter power setting may be selected. For example, a second transmitter power setting may be lower power than the first transmitter power setting. The second transmitter power setting may be selected to reduce overall transmission power, quantization noise, or for other reasons. Responsive to the change in transmitter power setting, the first PSD shape is modified to prepare a modified PSD shape for use with the second transmitter power setting. Modifying the PSD shape may include adjusting the reduced power associated with the notch and the adjacent frequencies. The transmitter is operated at the second transmitter power setting using the modified PSD shape rather than the first PSD shape.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although some examples may refer to adjusting power levels for frequencies associated with a notch in a power spectral density shape, the various adjustment techniques taught by this disclosure may be applicable to adjusting power levels of other features in the PSD shape. In other instances, well-known instruction instances, protocols, structures and techniques have not been shown in detail in order not to obfuscate the description.

A PSD shape may include one or more notches associated with particular frequencies (i.e. "notched" frequencies or reserved frequencies). In order to cause the power level notching at a particular frequency, the transmit power of the adjacent frequencies (adjacent to the notched frequencies) typically also needs to be reduced. Sometimes the PSD shape include a PSD curve that occupies adjacent frequencies and that extends between a first transmitter power level at some frequencies and the notched power level at the notched frequencies. The size of the PSD curve may depend upon the delta between the first transmitter power level and the notched power level. A larger delta from the first transmitter power level to the notched power level typically may result in a wider PSD curve. Conversely, a lower delta between the first transmitter power level and the reduced power level may be associated with less spectral roll-off. However, if the PSD curve is not adjusted for the various transmitter power levels, the PSD shape may become inefficient for a particular transmitter power level.

In accordance with this disclosure, a PSD shape may be modified based upon the transmitter power setting of a transmitter. The power associated with notched frequencies and adjacent frequencies may be adjusted responsive to a change in transmitter power setting. As a result of adjusting the power level for the adjacent frequencies, the performance of the transmission system using the modified PSD shape is improved as compared to the traditional approach. Furthermore, a PSD shape may be considered dynamic, being modified responsive to a change in transmitter power setting using an efficient algorithm for modifying a dynamic PSD shape.

Figure 1:
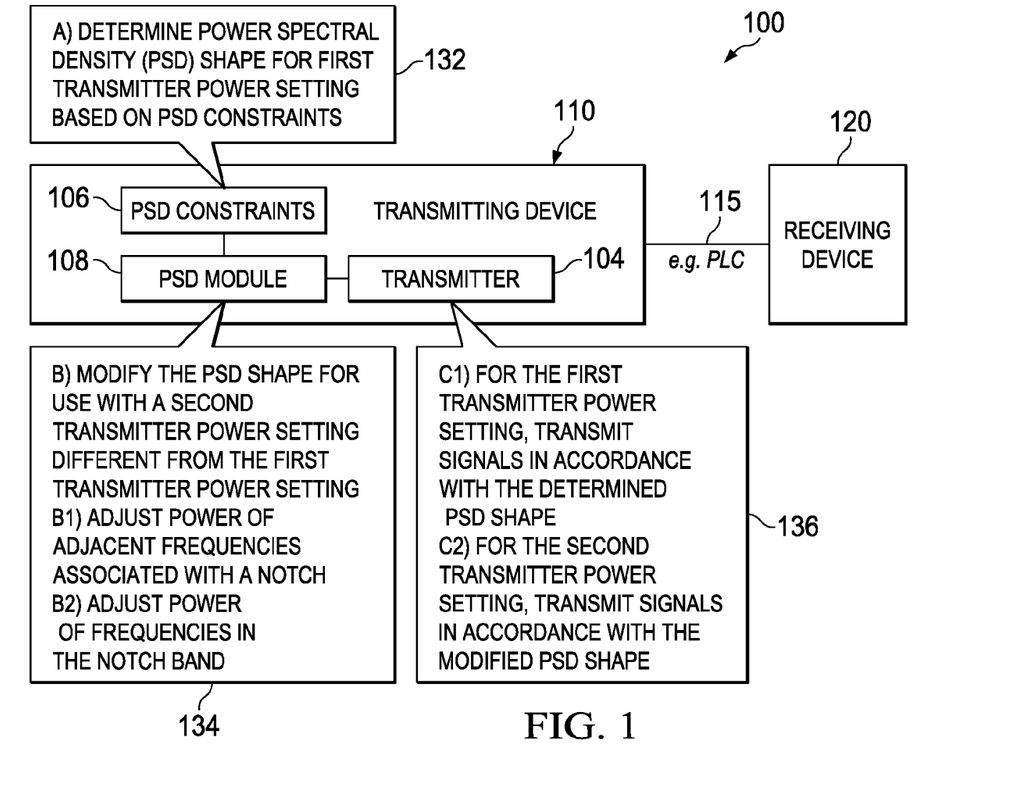
FIG. 1 is an example system diagram illustrating the use of a modified PSD shape for different transmitter power settings.

FIG. 1 depicts an example system 100 which will be described to introduce various aspects of the present disclosure. In FIG. 1, a transmitting device 110 is coupled to a communications medium 115. In one non-limiting example, the communications medium 115 may utilize powerline communications (PLC) over a powerline medium. In other alternatives, the communications medium 115 may be a variety of wireline or wireless mediums capable of carrying multi-carrier transmissions to a receiving device. Receiving device 120 is also coupled to the communications medium 115. The transmitting device 110 may include a communications unit (not shown) which regulates communications via the communications medium 115. The transmitting device 110 includes a PSD constraints component 106, a PSD module 108, and a transmitter 104, each of which may be included in the communications unit of the transmitting device 110. The transmitter 104 may be coupled to the communications medium 115 via a physical interface (not shown) such as an antenna, electrical interface, etc.

The PSD constraints component 106 may include memory, logic, or other mechanisms to determine various PSD constraints that should be used with a PSD shape. Any combination of PSD constraints may be managed by the PSD constraints component 106, including constraints based upon regulatory requirements, communication system configuration, vendor-specific implementations, or other constraints limiting power spectral density for one or more frequencies. In one example, the PSD constraints may be based upon regulatory requirements limiting the maximum radiated emissions for particular reserved frequencies. For example, a set of frequencies may be allocated by a regulatory agency for use with a particular communications technology. However, the regulatory agency may set transmission power limits, may identify reserved frequencies within the set of frequencies, or may mandate adaptive power levels based on detected interference. The regulatory requirements may be for public health, frequency reuse, or other purposes. Additionally, reducing power at particular frequencies may be done to improve performance at other frequencies, or for reducing environmental impact of transmission energy.

In another example, the PSD constraints may be based upon coexistence of two or more communications technologies utilizing same or similar frequencies. Limiting transmission power for particular frequencies may enable two or more networks to utilize the same frequency allocations without causing unreasonable interference with one another. For example, a powerline network may utilize a frequency band ranging from 2-30 MHz. Meanwhile, another network or technology may use particular frequencies that overlap with the powerline frequency band. For example, in North America, there are currently approximately 10 particular frequency ranges (i.e. reserved frequency ranges) that share the 2-30 MHz band otherwise associated with powerline communications. Therefore, a powerline communications device is configured to reduce the transmit power spectral density (PSD) approximately 30 db (from the maximum transmit power level) for the reserved sub-bands. These "notches" are typically narrow, less than 2 MHz wide. It should be understood that other reserved frequencies may be defined based upon short range radio interference, amateur radio transmissions, or other overlapping uses of particular frequencies.

In the examples in this disclosure, the above example of 30 db (from maximum transmit power level) is used as a PSD constraint throughout the examples. However, it should be understood that this is simply an example to aid in the understanding of the present disclosure and not intended as a specific limitation on the types of PSD constraints which may be used with the disclosed subject matter.

Having described the example system 100, various operations are now described in relation to FIG. 1. At stage A (block 132), the transmitting device 110 determines a power spectral density (PSD) shape for a first transmitter power setting based on the PSD constraints indicated by the PSD constraints component 106. As an example, the PSD shape may be based upon the maximum transmit power setting allowed, while the PSD constraints may require a notch in the PSD produce a 30 db reduced power (notched power level) for a notched frequency or frequencies.

The PSD shape may be stored in a memory (not shown) of the transmitting device 110 for subsequent use. At some point, the transmitting device 110 may determine to change the transmitter power setting of the transmitter 104. For example, a lower transmitter power setting may improve the overall transmission throughput on the communications medium 115. As an example, using a lower transmitter power setting may reduce the amount of quantization noise at an analog-to-digital converter (not shown) of the receiving device 120 by decreasing the range in power levels from the transmitter power level to the notched power level. Other reasons for changing the transmitter power setting may be readily conceived by persons of skill in the art. In an example used in this disclosure, the first transmitter power setting may be associated with a maximum transmit power, while a second transmitter power setting may represent a reduced transmit power level that is lower power than the first transmitter power setting.

At stage B (block 134), the PSD module 108 may modify the PSD shape for use with a second transmitter power setting different from the first transmitter power setting. For example, at B1, the PSD module 108 may adjust power of the adjacent frequencies adjacent to the notched frequencies. At B2, the PSD module 108 may adjust power of the notched frequencies to maximize throughput while maintaining the notched power level as defined by the PSD constraints. Further examples of operations to modify the PSD shape responsive to the change in transmitter power setting are described in the following subsequent figures.

At stage C (block 136), the transmitter 104 is configured to transmit signals. At C1, when operated at the first transmitter power setting, the transmitter 104 transmits signals in accordance with the first PSD shape. At C2, when operated at the second transmitter power setting, the transmitter 104 transmits signals in accordance with the modified PSD shape.

Figure 2:
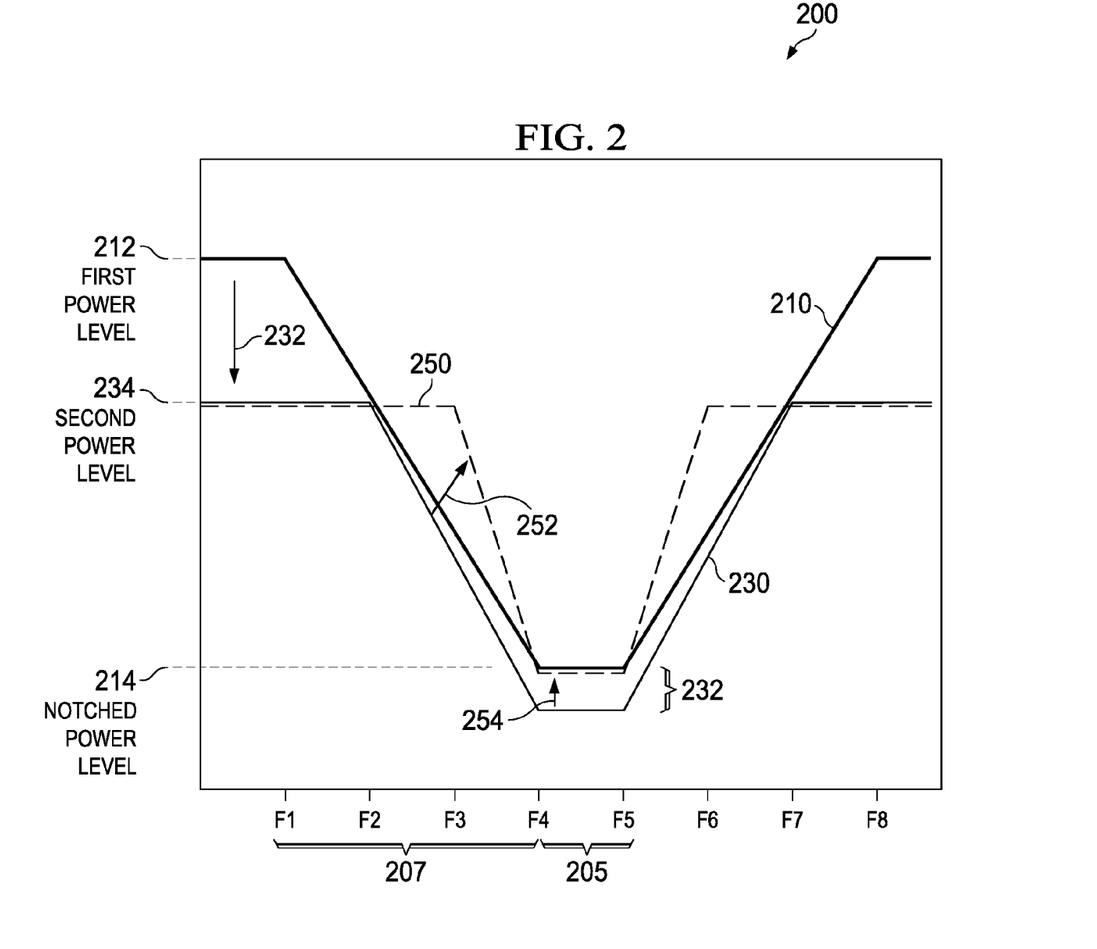
FIG. 2 is a conceptual illustration of a notch in a power spectral density shape and depicting a modified PSD shape based upon a change in transmitter power setting.

FIG. 2 is a conceptual illustration 200 of a power spectral density shape including a notch. It should be understood that the illustration in FIG. 2 is greatly exaggerated and simplified so as to focus the attention of the reader to several aspects of the present disclosure.

A first PSD shape 210 is associated with a first transmitter power setting 212. The first PSD shape 210 includes a notch 205 for a set of notched frequencies (frequencies F4 to F5). In accordance with an example PSD constraint, the notched frequencies are limited to no greater power than the notched power level 214. The first PSD shape 210 also includes a PSD curve 207 which extends from a first frequency F1 to a notched frequency F4.

In FIG. 2, as an example, the transmitter is changing (shown as change arrow 232) from the first transmitter power setting 212 to a second transmitter power setting 234. For example, when changing to the second transmitter power setting 234, the transmitter may simply change baseline power level associated with the transmitter circuitry such that an overall reduction in the power level is caused across all un-notched frequencies. In one example, the change from the first transmitter power level to the second transmitter power level is applied uniformly to all frequencies in the PSD shape that are at the first transmitter power level.

The PSD constraints still require the notched power level 214 for the notched frequencies. However, because the overall transmit power level has been reduced, the actual PSD output 230 from the transmitter may be lower than the notched power level 214 at the notched frequencies. For example, an unintended reduction (shown as 232) may be caused at the notched frequencies due to the change from the first transmitter power setting 212 to the second transmitter power setting 234 for the un-notched frequencies. Therefore, the actual PSD output 230 shows a result of using the first PSD shape and only changing the transmitter power setting without adjusting the PSD shape in accordance with this disclosure.

In FIG. 2, a modified PSD shape 250 illustrates a result of adjusting the power for the adjacent frequencies and notched frequencies. In one example adjustment (shown as arrow 252), the power of the adjacent frequencies may be adjusted. For example, rather than using a PSD curve (taper) from first frequency F1 to the notched frequency F4, the modified PSD shape may adjust the PSD curve to taper from a second frequency F3 to the notched frequency F4. The spectral roll-off of the transmitter may be known or determined such that the PSD shape is modified to meet the PSD constraints while maximizing the power associated with the adjacent frequencies.

In another example adjustment (shown as arrow 254), the power of the notched frequencies may be adjusted. For example, the power at frequencies F4-F5 may be increased such that the resulting modified PSD shape 250 still meets the PSD constraints (of the notched power level 214) while maximizing the power "under" the notch constraint.

The modified PSD shape 250 still conforms to the PSD constraints that were used to determine the first PSD shape 210. However, slight adjustments made to the adjacent frequencies and/or notched frequencies can improve performance of PSD shape in view of the different transmitter power setting. In other words, reducing the overall power can be performed in such a way that the notch depth (reduced power level for particular frequencies) is maintained without as much reduction on the adjacent frequencies.

In one implementation, the modified PSD shape 250 may result in gain for adjacent frequencies and notched frequencies despite overall reduction of the peak transmitter power level. Had the PSD shape been used without compensating for the change in transmitter power setting, actual PSD output may be more like the PSD shape 230. The gain obtained by modifying the PSD shape may provide for increased performance of the transmitted signals, such as the ability to encode further bits of data. Furthermore, a typical PSD shape for a transmitter may include several notches. For each notch in which the adjacent frequencies are adjusted to capture the wasted throughput, the overall physical throughput may increase slightly. Depending on the quantity of notches present in the PSD shape for the entire frequency band, physical throughput rates may be significantly improved as compared to the traditional approach.

In one example, the use of an adjustment algorithm may also improve performance at a transmitter. For example, one or more "dynamic" PSD shapes may be stored in memory. In one implementation, the dynamic PSD shape is modified in response to a change in transmitter power level. As memory may be limited, it may not be desirable to store large numbers of PSD shapes. However, in accordance with one embodiment of this disclosure, a first PSD shape for a first transmitter power setting may be modified to derive a second PSD shape for a second transmitter power setting without having the second PSD shape occupying valuable space in the memory. An adjustment algorithm may be executed to derive various PSD shapes based on a first PSD shape depending on the transmitter power setting.

In another example, the PSD adjustment algorithm may adapt based upon different remote receiver characteristics. For example, changes in transmitter filtering, guard-band times, signal levels, or symbol pulse shaping may be made to tune the transmitter to a particular receiver device. This tuning may alter the PSD roll-off or other transmitter characteristics associated with the transmitter. By dynamically modifying the PSD shape based on the transmitter characteristics for a particular transmission, the PSD shape conforms to the PSD constraints while maximizing throughput for the transmission. Other factors, such as receiver feedback or other adjustment variables may be used to further modify the PSD for various transmitter power settings.

Figure 3:
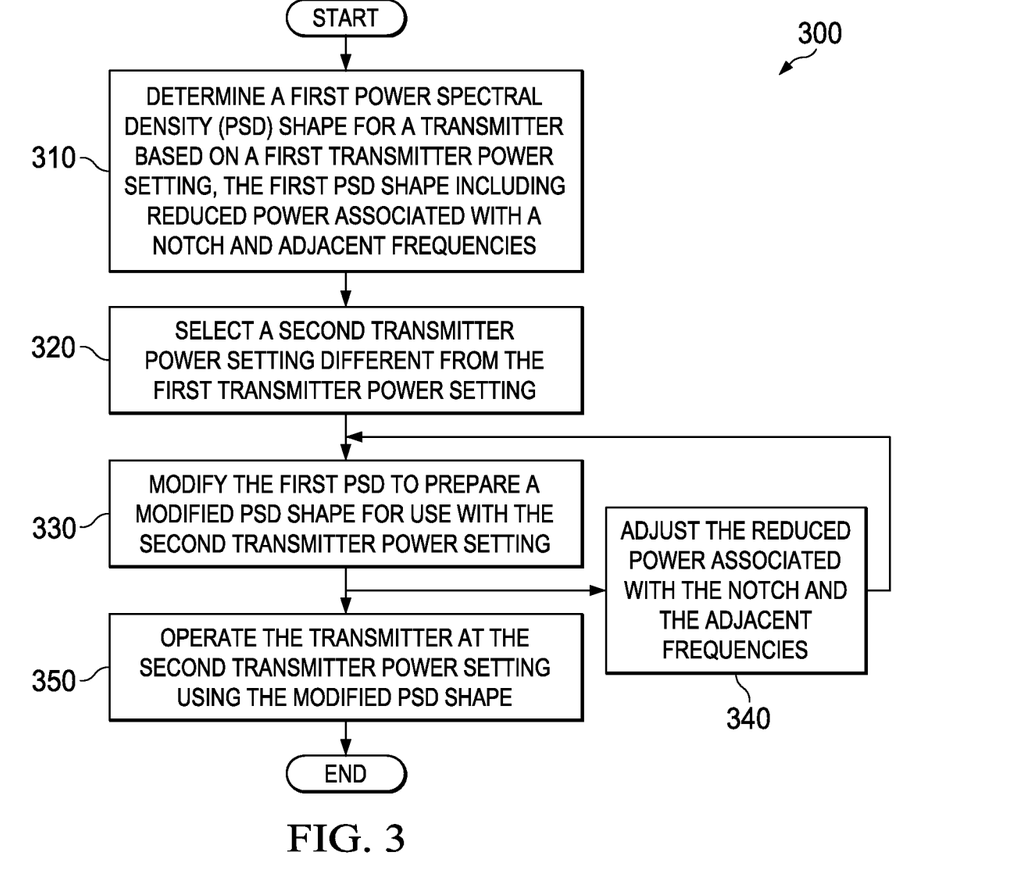
FIG. 3 is an example flowchart for modifying a PSD shape in accordance with an embodiment of the present disclosure.

FIG. 3 is an example flowchart 300 for modifying a PSD shape in accordance with an embodiment of the present disclosure. In one embodiment, the flowchart 300 includes example operations which may be performed by an electronic device or a communication unit of an electronic device. In other embodiments, the example operations may be performed by other types of equipment, or embodied program code on one or more computer readable media.

At 310, an operation includes determining a first power spectral density (PSD) shape for a transmitter based on a first transmitter power setting, the first PSD shape including reduced power associated with a notch and adjacent frequencies. For example, the PSD shape may be based on a maximum transmit power level associated with the communications medium.

At 320, an operation includes selecting a second transmitter power setting different from the first transmitter power setting. For example, the electronic device may select a lower transmitter power setting to reduce power consumption, improve performance of the transmission system, to conform to network or vendor-specific configurations, or other reasons readily conceivable by persons of skill in the art.

At 330, an operation includes modifying the first PSD to prepare a modified PSD shape for use with the second transmitter power setting. As an example of modifying the PSD shape, at 340, an operation includes adjusting the reduced power associated with the notch and the adjacent frequencies. It should be understood that adjusting the power associated with the notched frequencies and adjacent frequencies may be iterative. As an example, in one implementation, the power of the adjacent frequencies is adjusted before adjusting the power of the notched frequencies. Furthermore, block 340 may be performed for each of a plurality of notches in the first PSD shape.

At 350, an operation includes operating the transmitter at the second transmitter power setting using the modified PSD shape.

Figure 4:
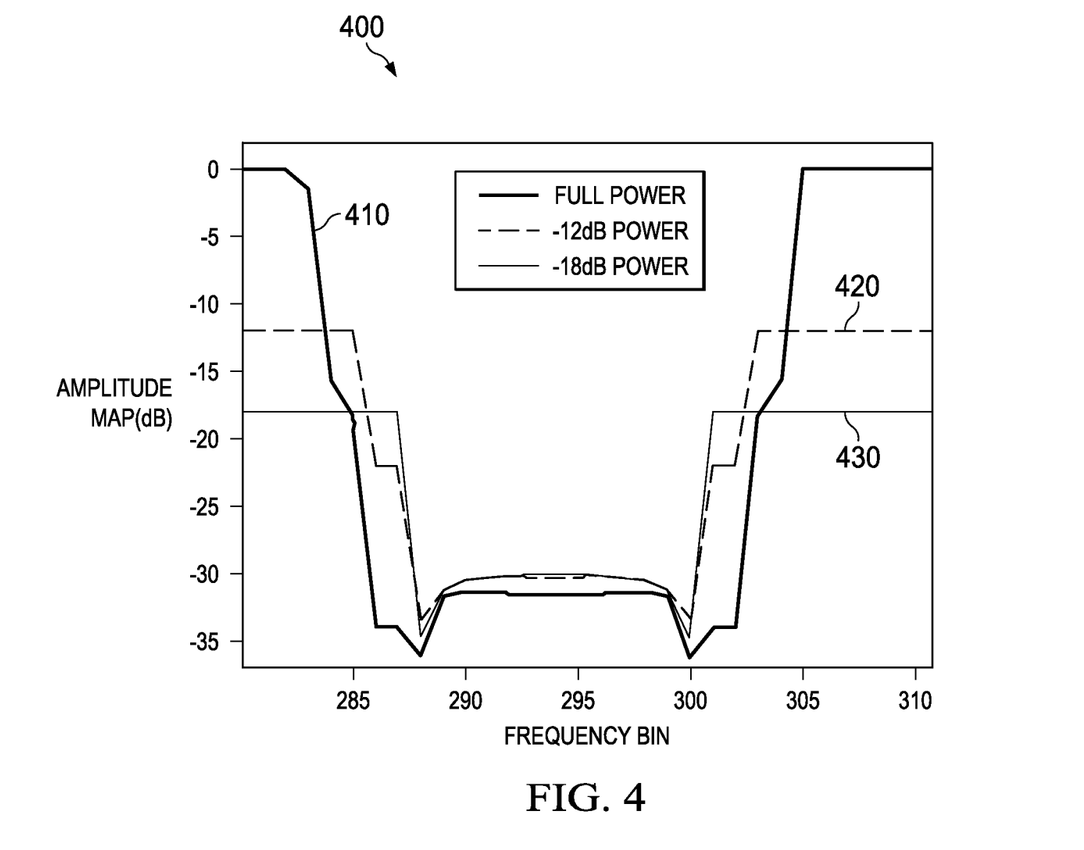
FIG. 4 is an illustration of a notch in a first PSD shape and various adjusted PSD shapes based upon various transmitter power settings.

FIG. 4 is an illustration 400 of a notch in a first PSD shape and various adjusted PSD shapes based upon various transmitter power settings. In FIG. 4, the different PSD shapes 410, 420, 430 are used for various transmitter power levels. The first PSD shape 410 shows a first PSD shape based upon a maximum transmitter power level (represented as "0 db"). The PSD constraint requires a notch depth of −30 db for particular frequencies (represented as 288-300 AV2 frequency bins). As shown in FIG. 4, the first PSD shape 410 includes PSD curves that taper from 283 to 288 and from 300 to 305.

A first modified PSD shape 420 shows the same notch based on the PSD constraint, but the transmitter power setting has been reduced to −12 db below the maximum transmitter power. The first modified PSD shape 420 includes an adjusted PSD curve for the adjacent frequencies and notched frequencies resulting in higher performance. For example at 285 AV2 Frequency bin, the power level is −12 db rather than −18 db that is used in the un-modified first PSD shape 410.

A second modified PSD shape 430 shows a third example in which the transmitter power setting is reduced to −18 db below the maximum transmit power. The second modified PSD shape 430 includes an adjusted PSD curve which still conforms to the notch PSD constraint, while maximizing power in the adjacent frequencies and in the notched frequencies.

Figure 5:
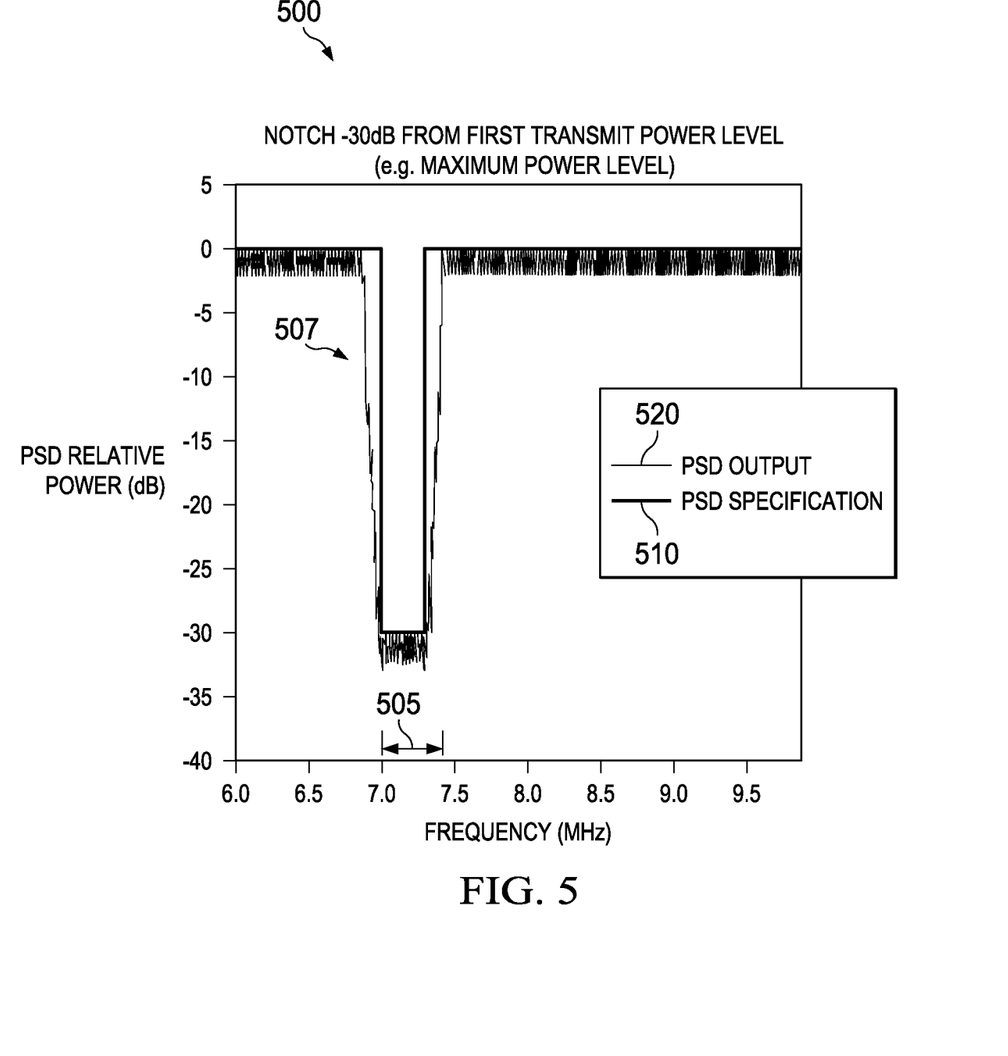
FIG. 5 depicts a first PSD shape defined based upon a PSD constraint for a 30 db notch at a reserved frequency band and a first transmitter power setting.

FIG. 5 is an illustration 500 of a first PSD shape defined based upon a PSD constraint for a 30 db notch at a reserved frequency band and a first transmitter power setting (e.g. maximum power level). The PSD constraint 510 (referred to as PSD specification) shows that notched frequencies 505 (e.g. 7.0-7.3 MHz) are required to be no more than −30 db power. It is noted that these example frequencies are for illustrative examples only. As shown in FIG. 5, the PSD constraint 510 represents the PSD shape that would be in compliance with the regulatory requirement to operate at −30 db power for the reserved frequencies. However, the PSD shape must take into account the spectral roll-off associated with transmissions. Therefore, a PSD curve 507 is introduced at the adjacent frequencies to make sure that the actual PSD shape 520 meets the required notch. Using this example PSD shape as an example first PSD shape, FIGS. 6-7 are used to show the results of changing the transmitter power setting.

Figure 6:
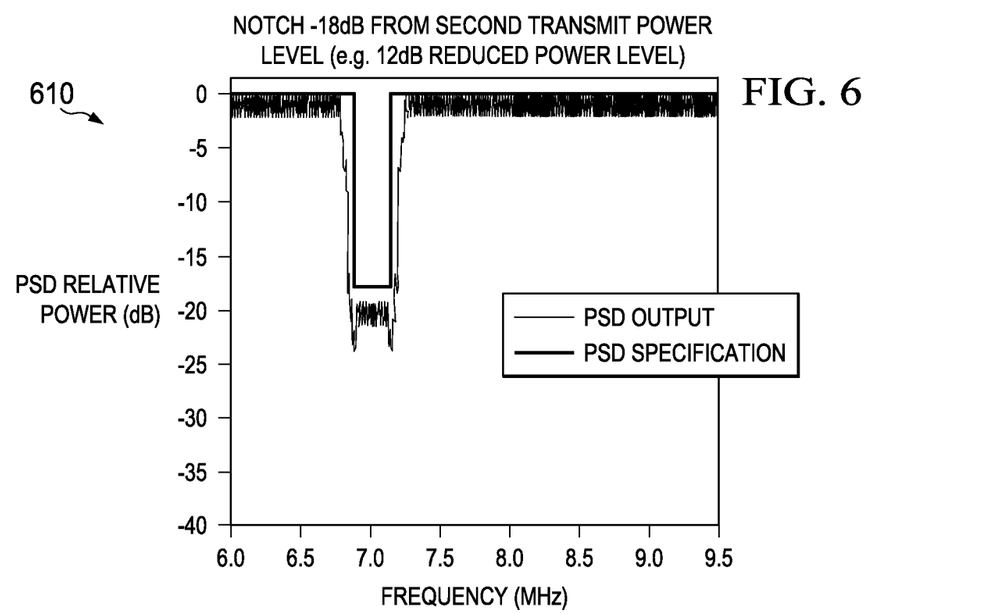
FIG. 6 depicts a resulting PSD output after reducing the first transmitter power setting from FIG. 5 to a second transmitter power setting based on the first PSD shape without modification.

FIG. 6 is a graph 610 that depicts the resulting actual PSD output after reducing the first transmitter power setting from FIG. 5 to a second transmitter power setting (−12 db reduced) without modifying the first PSD shape. In FIG. 6, the notch depth is −18 db relative to the transmitter power setting because the transmitter power setting is already −12 db below the maximum transmit power level. Therefore, the notched power level for frequencies 7.0-7.3 MHz has not changed, but the relative difference (−18 db) between the transmitter power setting in FIG. 6 and the notched power level is reduced.

Figure 7:
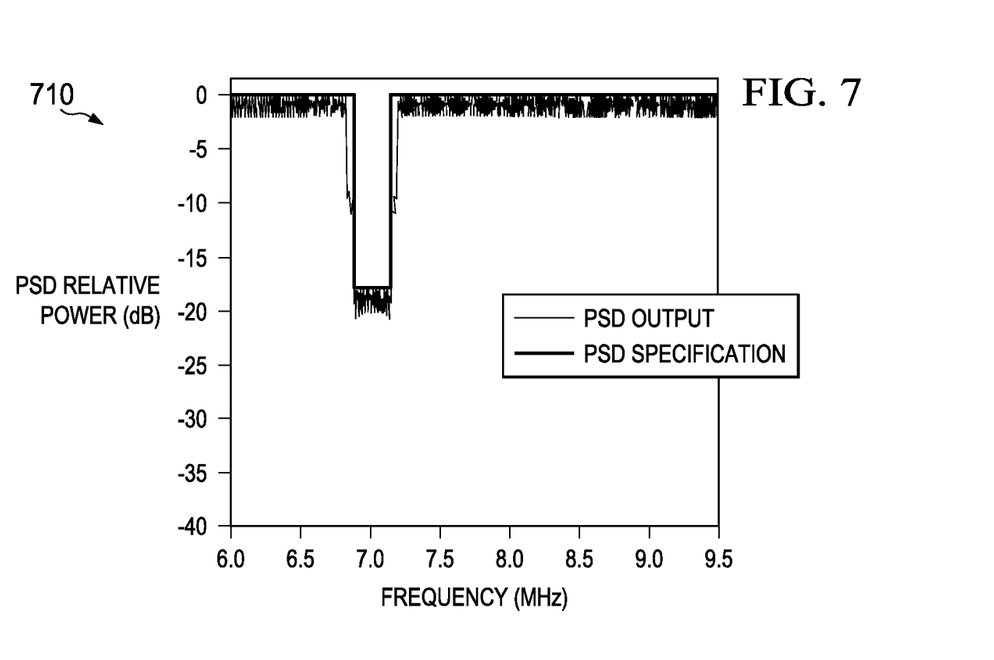
FIG. 7 depicts a resulting PSD output after reducing the first transmitter power setting from FIG. 5 to a second transmitter power setting based on a modified PSD shape in accordance with an embodiment of the present disclosure.

FIG. 7 is a graph 710 that depicts a resulting PSD output after reducing the first transmitter power setting from FIG. 5 to the a second transmitter power setting (−12 db reduced) with using a modified PSD shape. In particular, the modified PSD shape includes adjusted (i.e. increased) power associated with adjacent frequencies and notched frequencies while still being within the PSD constraint.

Figure 8A:
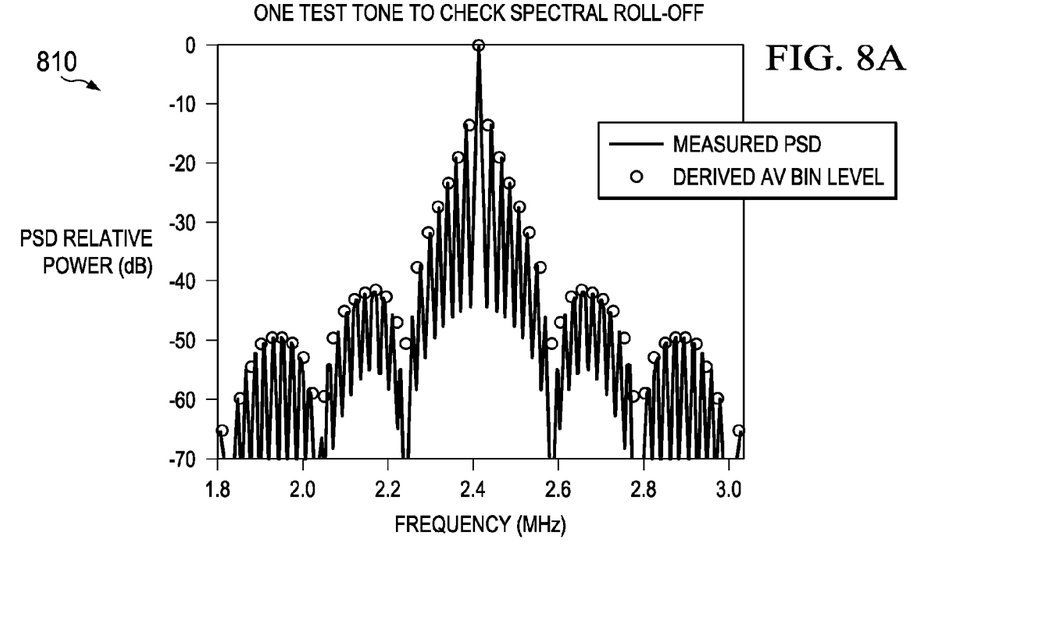
FIGS. 8A-8B depict output from example spectral roll-off tests to determine characteristics of a transmitter in accordance with an embodiment of the present disclosure.
Figure 8B:
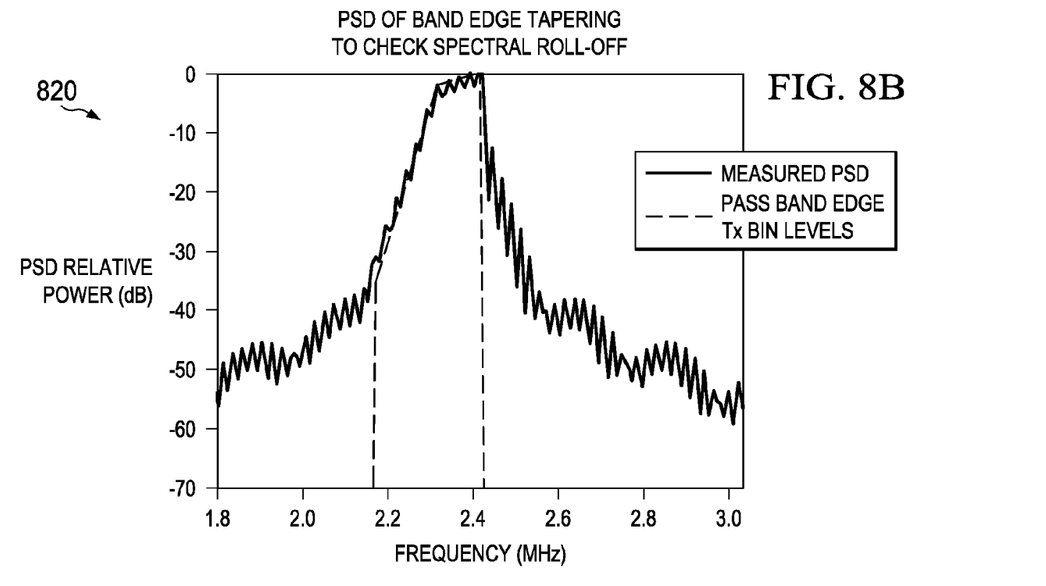

As described previously, one of the characteristics that may be taken into account in modifying a PSD shape for a different transmitter power setting is the spectral roll-off of a transmitter. FIGS. 8A-8B depict output from example spectral roll-off tests. FIG. 8A shows output 810 of a spectral roll-off test to measure the power spectral roll-off associated with a transmission on a single frequency. FIG. 8B shows output 820 of a spectral roll-off test to measure the power spectral roll-off associated with a transmission using a band edge tapering PSD curve.

These tests, and others, may be used to determine the power spectral roll-off associated with a particular transmitter and associated with various transmitter settings. Various parameters in the transmitter (such as windowing, transmitter filtering, etc.) may impact the PSD roll-off associated with the transmitter. Once known (or determined by measuring), the PSD roll-off may be used to determine an estimated power of a notch and adjacent frequencies that would result in a change in transmitter power setting. If the estimated power can be increased while still conforming to the PSD constraint, then the power for the adjacent frequencies and/or notched frequencies may be adjusted to increase the power. It should be understood that if the change in transmitter power setting is an increase in overall power, adjustments to the PSD shape may include decreasing power for particular frequencies to maintain conformance with the PSD constraint (i.e. required notch power level).

Figure 9:
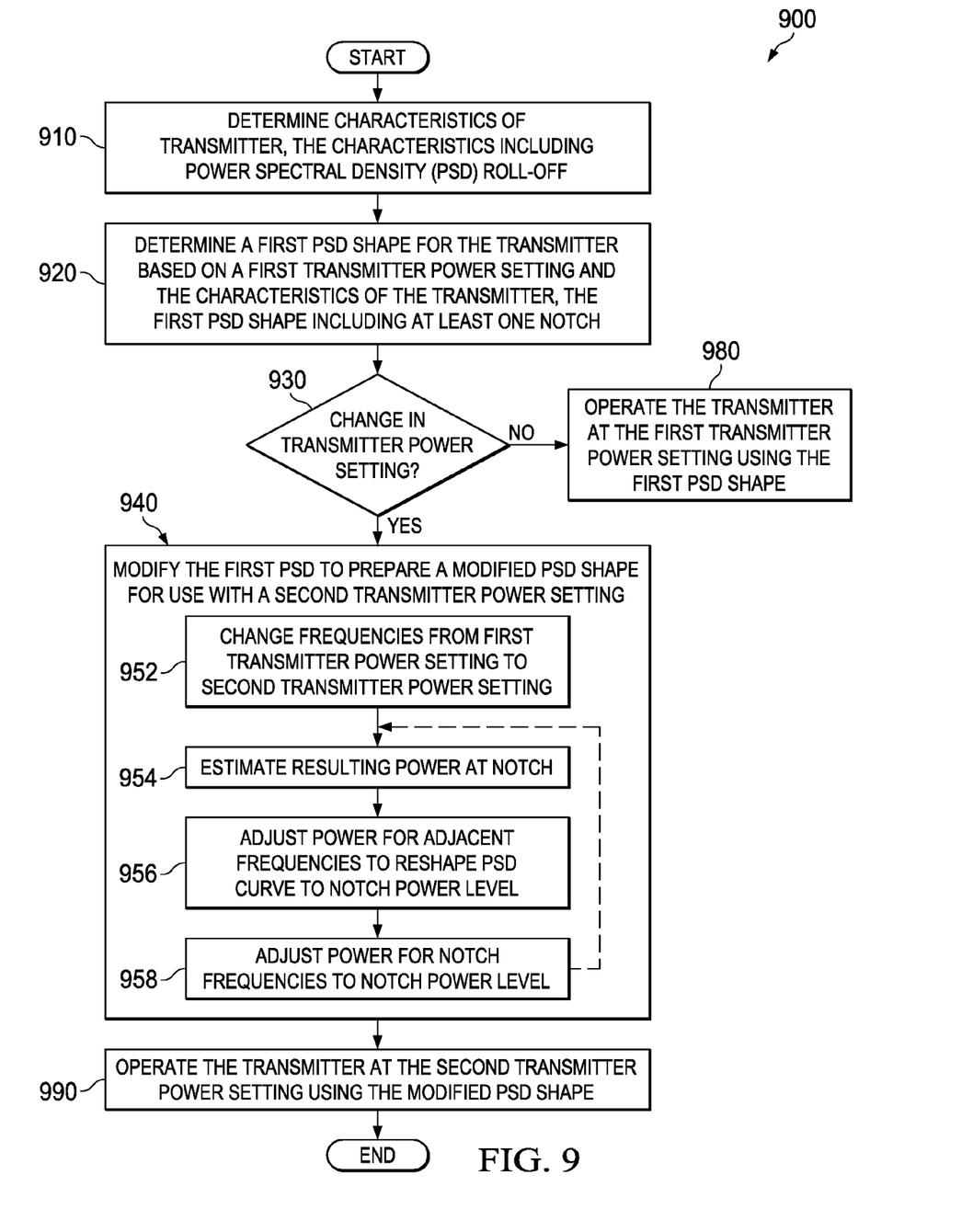
FIG. 9 is a further example flowchart for modifying a PSD shape in accordance with an embodiment of the present disclosure.

FIG. 9 is a further example flowchart 900 for modifying a PSD shape in accordance with an embodiment of the present disclosure. In one embodiment, the flowchart 900 includes example operations which may be performed by an electronic device or a communication unit of an electronic device.

At 910, an operation includes determining characteristics of transmitter, the characteristics including power spectral density (PSD) roll-off. For example, the output of PSD roll-off tests (such as FIGS. 8A and 8B) may be used to determine an appropriate curve or taper to use to achieve a desired notched power level.

At 920, an operation includes determining a first PSD shape for the transmitter based on a first transmitter power setting and the characteristics of the transmitter (e.g. the PSD roll-off). The first PSD shape may include at least one notch. The notch may be based on a PSD constraint, such as a regulatory requirement, a vendor-specific implementation design, a network configuration, or other constraint defining a required notch power level for notched frequencies.

At decision block 930, an operation includes determining if there is a change in transmitter power setting. If the transmitter power setting is unchanged, then the flowchart continues to block 980, where an operation includes operating the transmitter at the first transmitter power setting using the first PSD shape.

At decision block 930, if the transmitter power setting is changed (i.e. to a second transmitter power setting), then the flowchart continues to block 940. At 940, an operation includes modifying the first PSD shape to prepare a modified PSD shape for use with a second transmitter power setting. One or more operations may be performed in relation to modifying the first PSD shape to prepare the modified PSD shape. For example, a PSD adjustment algorithm may be executed in relation to block 940.

One example PSD adjustment algorithm is depicted in FIG. 9. It should be understood that the that PSD adjustment algorithm is provided as an example only and that changes, substitutions, or additions to the PSD adjustment algorithm are contemplated within the scope of this disclosure. The example PSD adjustment algorithm includes an operation, at 952, to change the power levels of all frequencies in the first PSD shape that are configured to use a power level between the first transmitter power setting and the second transmitter power setting to use the second transmitter power setting in the modified PSD shape. The example PSD adjustment algorithm includes an operation, at 954, to determine the estimated power at notch as a result of the change at operation 952. At 956, the example PSD adjustment algorithm includes an operation to adjust power for the adjacent frequencies to reshape PSD curve to the notch power level associated with the PSD constraint. At 958, the example PSD adjustment algorithm includes an operation to adjust the power for notched frequencies to bring them as close as possible to the notch power level without violating the PSD constraint. It should be understood that operations of the example PSD adjustment algorithm may be repeated for a plurality of notches in the PSD shape. For example, operations 954, 956, and 956 may be performed at least once for each notch of a plurality of notches. Furthermore, the operations to prepare the modified PSD shape may be performed iteratively in some embodiments.

After the modified PSD shape is prepared at 940, the flowchart continues to block 990, wherein an operation includes operating the transmitter at the second transmitter power setting using the modified PSD shape.

In one embodiment, modifying a PSD shape may occur each time the transmitter power setting is changed. Rather than generate a new PSD shape for each transmitter power setting or storing a plurality of PSD shapes in memory, a dynamic PSD shape may be generated as a baseline and then modified as needed for various transmitter power settings. Modifying an existing PSD shape using a PSD adjustment algorithm that adjusts the notched frequencies and adjacent frequencies may be more efficient than generating a new full PSD shape.

It should be understood that FIGS. 1-9 and the operations described herein are examples meant to aid in understanding embodiments and should not be used to limit embodiments or limit scope of the claims. Embodiments may perform additional operations, fewer operations, operations in parallel or in a different order, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
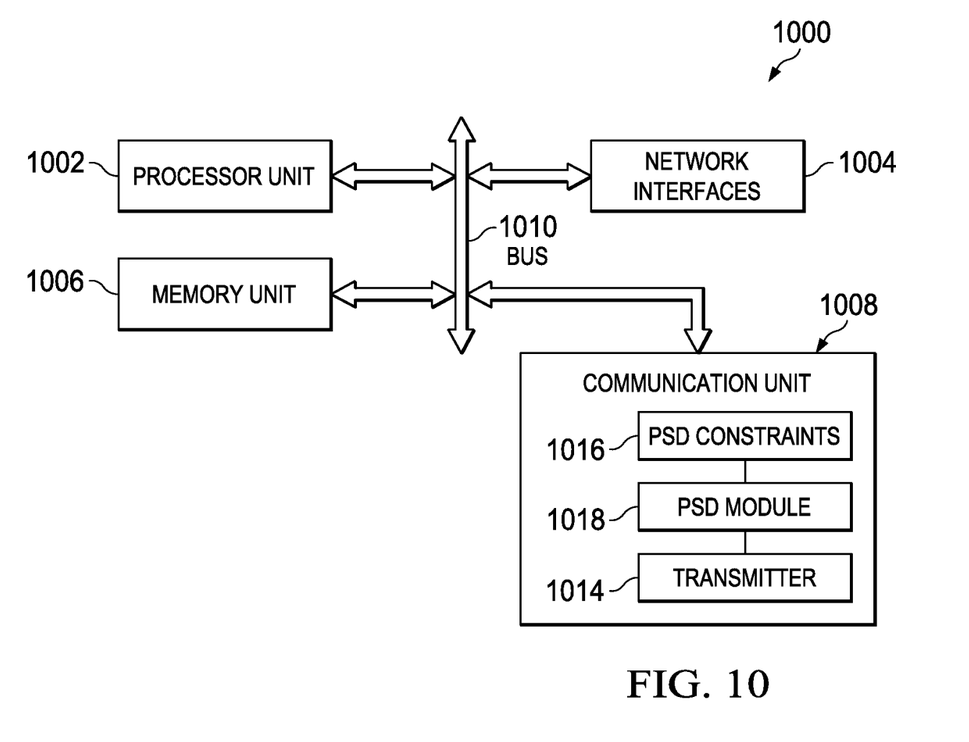
FIG. 10 is an example block diagram of one embodiment of an electronic device including a communication unit for modifying a PSD shape in accordance with embodiments of the present disclosure.

FIG. 10 is an example block diagram of one embodiment of an electronic device 1000 including a communication unit for modifying a PSD shape for various transmitter power settings in accordance with various embodiments of this disclosure. In some implementations, the electronic device 1000 may be one of a laptop computer, a netbook, a mobile phone, a powerline communication device, a personal digital assistant (PDA), or other electronic systems. The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, the electronic device 1000 may support multiple network interfaces—each of which is configured to couple the electronic device 1000 to a different communication network.

The electronic device 1000 also includes a communication unit 1008. The communication unit 1008 comprises a PSD constraints unit 1016, a PSD module 1018 and a transmitter 1014. It should be understood, that in some embodiments, the communication unit 1008 may also have a dedicated processor (e.g., such as a communication unit comprising a system on a chip, or board with multiple chips, or multiple boards, in which the communication may have one or more dedicated processor or processing unit(s), in addition to the main processor 1002). As described above in FIGS. 1-9, the PSD module 1018 implements functionality to modify a PSD shape responsive to a change in transmitter power setting. The PSD module 1018 may also generate the first PSD shape based on a first transmitter power setting prior to determining that a second transmitter power setting has been selected (e.g. selected by a component of the communication unit 1008 or configured by a communications protocol). Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1004 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the inventive subject matter is not limited to them. In general, techniques for modifying a PSD shape as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by an apparatus for communicating via a multi-frequency communications channel, the method comprising:
   determining, by the apparatus, a first power setting for a transmitter of the apparatus;
   determining a first power spectral density (PSD) shape based, at least in part, on the first power setting for the transmitter, wherein the first PSD shape defines power levels for each of a plurality of frequencies to communicate with a receiving device, the first PSD shape including a first notch power level for one or more notch frequencies associated with a notch and reduced power associated with at least one adjacent frequency, adjacent to the notch;
   operating the transmitter at the first power setting using the first PSD shape;
   determining to reduce the first power setting to a second power setting, after said determining the first PSD shape;
   modifying the first PSD shape to prepare a modified PSD shape for use with the second power setting by increasing power for the one or more notch frequencies and for the at least one adjacent frequency, the modified PSD shape including a second notch power level for the one or more notch frequencies that is the same as the first notch power level; and
   operating the transmitter at the second power setting using the modified PSD shape.

2. The method of claim 1, wherein said modifying the first PSD shape comprises:
   determining a PSD roll-off associated with the transmitter;
   determining an estimated power of the notch and the at least one adjacent frequency based, at least in part, on the second power setting and the PSD roll-off; and
   increasing power for the at least one adjacent frequency based, at least in part, on the estimated power of the notch.

3. The method of claim 2, wherein said increasing the power for the one or more notch frequencies and for the at least one adjacent frequency further comprises:
   after said increasing the power for the at least one adjacent frequency, determining a power for the one or more notch frequencies associated with the notch; and
   increasing the power for the one or more notch frequencies.

4. The method of claim 1, further comprising:
   storing at least one of the first PSD shape and the modified PSD shape in a memory storage.

5. The method of claim 1, wherein said modifying the first PSD shape to prepare the modified PSD shape occurs during operation of the transmitter without storing the modified PSD shape in a memory storage.

6. The method of claim 1, wherein the first PSD shape includes a plurality of notches defining reduced power for a set of reserved frequency bands.

7. The method of claim 1, wherein said operating the transmitter at the second power setting using the modified PSD shape results in an increased throughput performance than an alternative operating the transmitter at the second power setting using the first PSD shape.

8. The method of claim 1, wherein said operating the transmitter using the modified PSD shape comprises transmitting signals at power levels defined for each frequency in the modified PSD shape.

9. The method of claim 1, further comprising:
   modifying the first PSD shape based, at least in part, on at least one transmission power characteristic for a particular receiver.

10. The method of claim 1,
    wherein the first PSD shape defines a PSD curve for the at least one adjacent frequency, the PSD curve extending from a first power level at a first frequency to the first notch power level at the one or more notch frequencies, and
    wherein said modifying the first PSD shape includes reducing a quantity of adjacent frequencies included in the PSD curve and adjusting the PSD curve such that the PSD curve extends from a second power level at a second frequency to the second notch power level at the one or more notch frequencies.

11. An apparatus for communicating via a multi-frequency communications channel, the apparatus comprising:
a transmitter; and
a power spectral density (PSD) module, the PSD module configured to:
determine a first power setting for the transmitter;
determine a first PSD shape based, at least in part, on the first power setting for the transmitter, wherein the first PSD shape defines power levels for each of a plurality of frequencies to communicate with a receiving device, the first PSD shape including a first notch power level for one or more notch frequencies associated with a notch and reduced power associated with at least one adjacent frequency, adjacent to the notch;
operate the transmitter at the first power setting using the first PSD shape;
determine to reduce the first power setting to a second power setting, after determining the first PSD shape;
modify the first PSD shape to prepare a modified PSD shape for use with the second power setting by increasing power for the one or more notch frequencies and for the at least one adjacent frequency, the modified PSD shape including a second notch power level for the one or more notch frequencies that is the same as the first notch power level; and
operate the transmitter at the second power setting using the modified PSD shape.

12. The apparatus of claim 11, wherein the PSD module configured to modify the first PSD shape includes the PSD module being configured to:
determine a PSD roll-off associated with the transmitter;
determine an estimated power of the notch and the at least one adjacent frequency based, at least in part, on the second power setting and the PSD roll-off;
increase power for the at least one adjacent frequency based, at least in part, on the estimated power of the notch; and
increase the power for one or more notch frequencies.

13. The apparatus of claim 11, further comprising a memory configured to store at least one of the first PSD shape and the modified PSD shape for subsequent use with the transmitter.

14. The apparatus of claim 11,
wherein the first PSD shape defines a PSD curve for the at least one adjacent frequency, the PSD curve extending from a first power level at a first frequency to the first notch power level at the one or more notch frequencies, and wherein the PSD module is further configured to:
reduce a quantity of adjacent frequencies included in the PSD curve; and
adjust the PSD curve such that the PSD curve extends from a second power level at a second frequency to the second notch power level at the one or more notch frequencies.

15. A non-transitory computer readable medium having instructions stored therein which, when executed by a processor of a device for communicating via a multi-frequency communications channel, cause the device to:
determine a first power setting for a transmitter of the device;
determine a first power spectral density (PSD) shape based, at least in part, on the first power setting for the transmitter, wherein the first PSD shape defines power levels for each of a plurality of frequencies to communicate with a receiving device, the first PSD shape including a first notch power level for one or more notch frequencies associated with a notch and reduced power associated with at least one adjacent frequency, adjacent to the notch;
operate the transmitter at the first power setting using the first PSD shape;
determine to reduce the first power setting to a second power setting, after determining the first PSD shape;
modify the first PSD shape to prepare a modified PSD shape for use with the second power setting by increasing power for the one or more notch frequencies and for the at least one adjacent frequency, the modified PSD shape including a second notch power level for the one or more notch frequencies that is the same as the first notch power level; and
operate the transmitter at the second power setting using the modified PSD shape.

16. The non-transitory computer readable medium of claim 15,
wherein the first PSD shape defines a PSD curve for the at least one adjacent frequency, the PSD curve extending from a first power level at a first frequency to the first notch power level at the one or more notch frequencies, and
wherein the instructions that cause the device to modify the first PSD shape comprises instructions which when executed by the processor of the device cause the device to:
reduce a quantity of adjacent frequencies included in the PSD curve; and
adjust the PSD curve such that the PSD curve extends from a second power level at a second frequency to the second notch power level at the one or more notch frequencies.

* * * * *